J. F. WINCHELL.
Gate.
No. 58,161.
Patented Sept. 18, 1866.
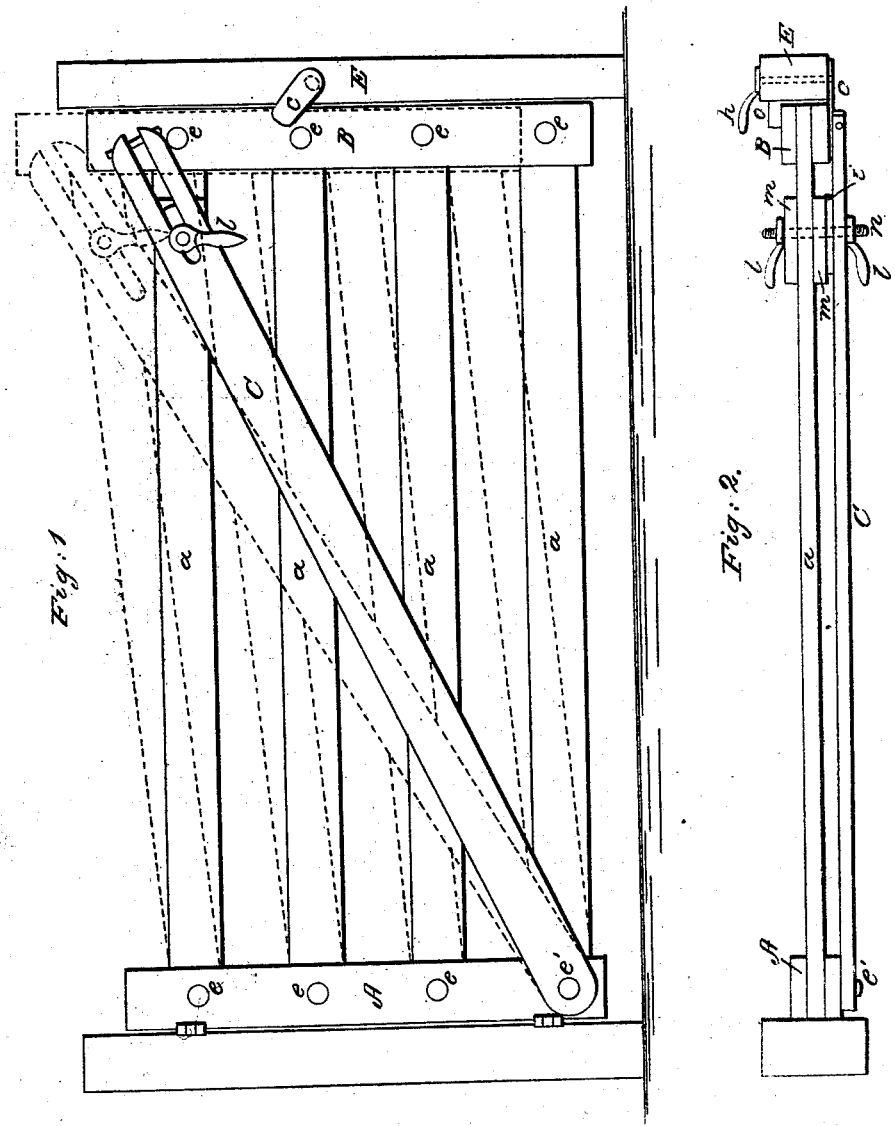
Witnesses:
P. T. Dodge.
W. W. Dodge.
Inventor:
James F Winchell.
By S. W. C. Dodge.

UNITED STATES PATENT OFFICE.

JAMES F. WINCHELL, OF SPRINGFIELD, OHIO.

IMPROVEMENT IN GATES.

Specification forming part of Letters Patent No. 58,161, dated September 18, 1866.

*To all whom it may concern:*

Be it known that I, JAMES F. WINCHELL, of Springfield, in the county of Clarke and State of Ohio, have invented certain new and useful Improvements in Farm-Gates; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use the invention, I will proceed to describe it.

Figure 1 is a side elevation, and Fig. 2 a top-plan view, of the same.

My invention consists in a novel method of bracing a gate, the bars of which are pivoted at both ends, so that the front end of the gate can be adjusted at any desired height.

I construct my gate of boards or slats $a$, of any desired size. These boards are pivoted at the rear end to a bar, A, by means of bolts or pins $e$, and at the front end to a similar bar, B, by a similar series of bolts, $e$, as shown in Fig. 1. I then provide a bar, C, which is secured at the heel of the gate to the pin or bolt $e'$, from whence it extends to the upper front corner of the gate, as shown clearly in Fig. 1. This brace C has its upper end slotted, as shown, and a bolt, $n$, is passed through a hole in the upper bar, $a$, and also through the slot in the brace C, and is provided on each side of the gate with a jam-nut, $l$, as represented, a cleat, $m$, being secured to each side of the bar $a$ to give the bolt a firm support and to bring it out flush with the face of the bar B. A rubber washer, $i$, is placed between the cleat $m$ and brace C, as shown in Fig. 2, to hold the brace tight and prevent it from slipping.

It will be readily seen that when thus constructed the front end of the gate may be raised, as represented in red, to any desired extent at any time by simply loosening either of the nuts $l$ and lifting that end of the gate.

In order to prevent the nut on one side from being loosened by turning the other one to tighten it up, the bolt $n$ should have the screw on its ends cut in opposite directions—that is to say, one should be a right and the other a left handed screw.

It will also be observed that by locating the device for holding the brace at the front end of the gate it can be raised or lowered by one person alone, one hand being used to hold the gate, while with the other he loosens or tightens up the nut, as required.

By these means the gate may be readily adjusted to adapt it to any position on a side hill, or to compensate for the sagging or inclining of the post to which it is hung. It may also be elevated, so as to swing over snow-drifts in winter, and to permit the passage of small animals, like hogs and sheep, while at the same time preventing the passage of larger animals, such as cattle and horses.

To fasten the gate I use a button consisting of two pieces, $c$, as shown in Fig. 1, each being secured rigidly to a bolt extending through the post E, one on each side of the post, so that when the gate is closed they may be turned over, as represented in Fig. 1, and thus made to embrace the bar B and hold the gate secure; or, in case the gate is hung to swing in one direction only, as here represented, a handle, $h$, may be attached to one side instead of the plate $c$, as represented in Fig. 2.

Having thus described my invention, what I claim is—

1. In combination with the pivoted bars $a$, the slotted brace C, secured by the bolt $n$ and nuts $l$, when arranged to operate as and for the purpose set forth.

2. The rubber washer $i$, when used in combination with the brace C and gate, as and for the purpose set forth.

JAMES F. WINCHELL.

Witnesses:
P. T. DODGE,
N. C. DODGE,